US012600908B2

(12) United States Patent (10) Patent No.: US 12,600,908 B2
Kashiwagi et al. (45) Date of Patent: Apr. 14, 2026

(54) ETCHING SOLUTION AND ETCHING METHOD FOR GOLD OR GOLD ALLOY

(71) Applicant: KANTO KAGAKU KABUSHIKI KAISHA, Tokyo (JP)

(72) Inventors: Itsuki Kashiwagi, Tokyo (JP); Yuki Yoshida, Tokyo (JP); Koichi Inoue, Tokyo (JP); Iori Kawashima, Tokyo (JP)

(73) Assignee: KANTO KAGAKU KABUSHIKI KAISHA, Tokyo (JP)

( * ) Notice: Subject to any disclaimer, the term of this patent is extended or adjusted under 35 U.S.C. 154(b) by 298 days.

(21) Appl. No.: 18/273,746

(22) PCT Filed: Jan. 19, 2022

(86) PCT No.: PCT/JP2022/001757
§ 371 (c)(1),
(2) Date: Jul. 21, 2023

(87) PCT Pub. No.: WO2022/158481
PCT Pub. Date: Jul. 28, 2022

(65) Prior Publication Data
US 2024/0076547 A1 Mar. 7, 2024

(30) Foreign Application Priority Data
Jan. 21, 2021 (JP) ................................. 2021-008291

(51) Int. Cl.
*C09K 13/00* (2006.01)
*C23F 1/14* (2006.01)
(52) U.S. Cl.
CPC ................ *C09K 13/00* (2013.01); *C23F 1/14* (2013.01)

(58) Field of Classification Search
CPC ... C09K 13/00; C23F 1/14; C23F 1/30; C23F 1/40; C23F 11/122; C23F 11/145; H01L 21/32134; H01L 21/308
USPC ........................ 252/79.1–79.4; 438/745, 754
See application file for complete search history.

(56) References Cited

U.S. PATENT DOCUMENTS 5,221,421 A 6/1993 Leibovitz et al.

FOREIGN PATENT DOCUMENTS

EP 0 517 369 A2 12/1992
JP H05-136152 A 6/1993
JP H05-251425 A 9/1993
JP H08-148810 A 6/1996
(Continued)

*Primary Examiner* — Duy Vu N Deo
(74) *Attorney, Agent, or Firm* — Maschoff Brennan

(57) ABSTRACT

It is known that when etching gold films using etching solutions containing iodine and iodide, N-methyl-2-pyrrolidinone (NP) is added to improve the etching solution's wettability, microfabrication property, and solution life. However, in recent years, the use of NMP has been regulated due to its adverse effects on human health. The present invention provides an etching solution and etching method for gold film that improves wettability, microfabrication property, and solution life without containing NP. In order to address the problem of the prior art, the present invention provides etching solutions and etching methods for gold films that improve wettability, microfabrication property, and liquid life without NMP, characterized by the inclusion of a specific organic solvent in the etching solution containing iodine and iodide.

12 Claims, 3 Drawing Sheets

(56)        References Cited

FOREIGN PATENT DOCUMENTS

JP        2004-211142  A      7/2004
JP         2006199987  A   *  8/2006
JP        2006-291341  A     10/2006
JP        2014-047402  A      3/2014
KR        20100107399  A   *  10/2010   ............... C23F 1/02

* cited by examiner

ETCHING SOLUTION AND ETCHING METHOD FOR GOLD OR GOLD ALLOY

FIELD OF THE INVENTION

The present invention relates to an etching method and an etching solution for gold or gold alloy formed on a substrate such as a semiconductor wafer.

BACKGROUND OF THE INVENTION

Nowadays, gold films are used as electrical conductors in integrated circuits and printed circuit boards. Gold films not only have high conductivity but also are easy to deposit and are chemically stable, but they are challenging to etch. The etching method of gold films is performed by using wet etching, which usually includes a dipping method and a spin method. In the dipping method, the etching solution is stored in an etching tank made of materials such as quartz or Teflon® and the wafer is immersed in it. In the spin method, the wafer is vacuum sucked or mechanical chucked onto a support stage and sprayed with the etching solution while it is rotated.

Examples of etching solutions for gold films include "cyanide-based", "aqua regia-based" and "iodine-based" solutions. For "cyanide-based" solution, which consists of sodium hydroxide and sodium cyanide, the "cyanide-based" solution is easy to etch because gold easily forms a complex with cyanide ions, but the "cyanide-based" solution is with drawbacks of difficult handle due to it is with strong, basicity, and strong irritation and toxicity. Therefore, in the electronic industry, there are only very few usage examples of the cyanide-based solution, except for an example that lead pattern is complete removed after electroplating (prior art document 1). The "aqua regia-based" solution is a mixture of hydrochloric acid and nitric acid, and it is commonly used in the treatment of gold films on semiconductor substrates, but it has the drawbacks of slow etching speed and being difficult to handle due to its strong acidity (prior art document 2). In contrast, the "iodine-based" solution, composed of potassium iodide and iodine, has been widely used as an etching solution for gold films on semiconductor substrates because it is neutral pH and is easy to handle (prior art document 3 and prior art document 4).

It is also known that organic solvents are included in the iodine-based etching solution to improve wettability, microfabrication property, and lifetime of the solution on the substrate, wherein N-methyl-pyrrolidinone (NMP) is particularly useful (patent document 5, patent document 6).

However, in recent years, due to concerns about the detrimental effects of N-methyl-2-pyrrolidone (NMP) on human health, regulations on NMP have become stricter, and the use of etching solutions containing NMP has become challenging, leading to an increasing demand for NMP-free gold or gold alloy etching solutions.

PRIOR ART DOCUMENTS

Patent Document 1: JPH-08148810
Patent Document 2: JPH-05136152
Patent Document 3: JPH05251425
Patent Document 4: U.S. Pat. No. 5,221,421
Patent Document 5: JP2004-211142A
Patent Document 6: JP2006-291341A

SUMMARY OF THE INVENTION

Therefore, the purpose of the present invention is to provide a gold or gold alloy etching solution and etching method that does not contain NMP, but is with excellent wettability and microfabrication property on substrates with gold and gold alloy films, and with a long solution life.

During the diligent investigation of gold or gold alloy etching solutions and etching methods without NMP and with excellent wettability, microfabrication properties and a long solution life for substrates having gold and gold alloy films, we found that iodine etchant containing a specific organic solvent has excellent wettability and microfabrication properties for substrates having gold and gold alloy films and a long solution life even when it does not contain NMP, and thus achieved the present invention.

That is, the present invention relates to:

[1] An etching solution for gold or gold alloy, comprising: iodine, iodide, organic solvent and water, wherein the organic solvent is one or more selected from the group consisting of 3-methoxy-N,N-dimethylpropanamide, 3-butoxy-N,N-dimethylpropanamide, ethylene glycol, propylene glycol, diethylene glycol, 1,2-ethanediol, 1,4-butanediol and 2,3-butanediol.

[2] The etching solution as claimed in [1], wherein the organic solvent is 3-methoxy N,N-dimethylpropanamide.

[3] The etching solution as claimed in [1] or [2], wherein the etching solution is free of N-methyl-2-pyrrolidinone.

[4] The etching solution as claimed in [1] to [3], wherein the iodide is potassium iodide.

[5] A method for etching a gold film formed on a substrate, comprising immersing the substrate in the etching solution as claimed in any one of [1] to [4].

With the present invention, an etching solution for gold or gold alloy without using NMP can fully deal with the situation that the composition and performance of the etching solution is required to remain unchanged and even the situation that a highly precise microfabrication technique is required.

DETAILED DESCRIPTION OF THE PREFERRED EXAMPLES

Figure 1:
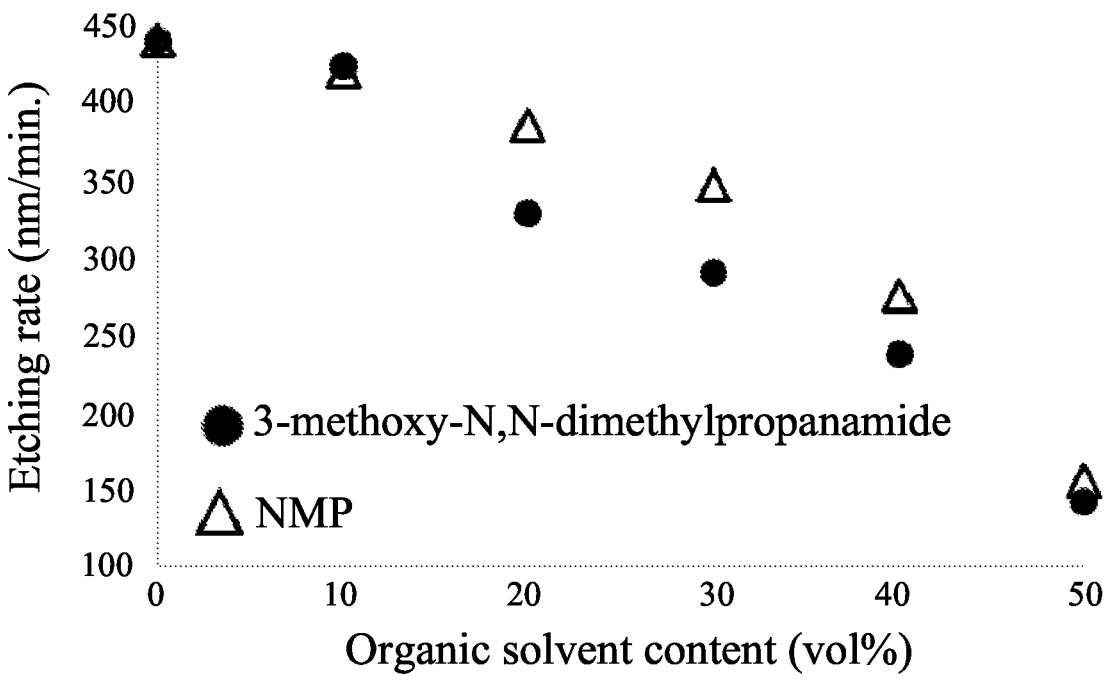
FIG. 1 is a graph showing the etching rate of gold film in an etching solution containing NMP or 3-methoxy-N,N-dimethylpropanamide.

The following is a detail description of the present invention.

An etching solution for gold or gold alloy of the present invention comprises iodine, iodide, organic solvent and water.

The iodides are not particularly limited and include, for example, potassium iodide, sodium iodide, ammonium iodide, rubidium iodide, cesium iodide, magnesium iodide, calcium iodide, strontium iodide, zinc iodide, cadmium iodide, mercury(II) iodide, and lead(II) iodide, and one or more of these can be used. Potassium iodide, sodium iodide, and ammonium iodide are especially preferred as iodides in terms of water solubility, price, ease of handling, and toxicity.

The content of iodine in the iodine-based etching solution is not limited, but can be from 1 to 1000 mM, for example. Preferably, it is 10 to 200 mM. The content of iodide in the iodine etching solution is not particularly limited, but can be, for example, from 1 to 3000 mM. Preferably, it is from 150 to 1500 mM. The ratio of the content of iodine to iodide (molar concentration ratio, iodine:iodide) is not particularly limited, but preferably 1:3 to 1:10, and even more preferably 1:5 to 1:10.

The organic solvent used in the present invention are capable of suppressing the etching rate of gold or gold alloy films, have excellent wettability, have gold surface smoothing ability, are effective in suppressing the amount of side etching, and suppress the volatilization of iodine. Specifically, 3-methoxy-N,N-dimethylpropanamide, 3-butoxy-N, N-dimethylpropanamide, ethylene glycol, propylene glycol, diethylene glycol, 1,2-ethanediol, 1,4-butanediol and 2,3-butanediol; preferably 1,4-butanediol, ethylene glycol, 3-methoxy-N,N-dimethylpropanamide, and more preferably 3-methoxy-N,N dimethylpropanamide.

The content of organic solvents in the etching solution is not limited, and it is preferable to adjust the amount used according to the type of organic solvent used. Generally, a range of 1 to 99% by volume can be used, preferably 5 to 50% by volume, and more preferably 10 to 40% by volume. For example, if the additive is N,N-dimethylpropanamide, the amount used is preferably 10-30% by volume, more preferably 15-25% by volume.

The etching solution also contains water. The content of water in the etching solution is not limited and can be, for example, the residual portion of other components. For example, the water content can be 1 to 99% by volume, preferably 60 to 90% by volume.

The etching solution described above is used to etch gold and gold alloys. Gold alloys include, for example, gold alloys with palladium, magnesium, aluminum, titanium, manganese, iron, cobalt, nickel, molybdenum, tungsten, platinum, silver, copper, etc. The etching solution is applicable to a combination of one or more of these. In the gold alloy, it is preferable that the gold content is 60% or more by weight and it is more preferable that the gold content be 80% or more by weight.

Etching conditions using the etching solution of the present invention are not limited, and can be performed, for example, according to the conditions of known etching methods.

As a method for contacting the etching target with the etching solution, there is a dipping method in which a container is filled with an iodine-based etching solution and the etching target is immersed. At that time, it is preferable to oscillate the etching object or forcefully circulate the iodine etching solution in the container. This allows the etching solution to be etched uniformly. The spray method, in which iodine etching solution is sprayed onto the etched object, or the spin method, in which iodine etching solution is discharged from a nozzle onto the spinning etched object, may also be used. These may also be used in combination with the dip method. The etching time is not limited, and can be from 1 to 60 minutes. Also, the etching temperature (iodine etching solution temperature for the dip method, or iodine etching solution temperature or etching object temperature for the spray and spin methods) is not limited, and may be, for example, 20 to 50° C. In this example, the temperature of the iodine etching solution, etching object, etc. may be adjusted by heating means such as a heater or cooling means, if necessary.

The present invention also relates to a method for etching a gold film or gold alloy film using the etching solution described above, and a method for manufacturing semiconductor materials formed by said method. Semiconductor materials formed by the above-mentioned method include wiring materials, bumps, and the like. The present invention has been described in detail based on suitable examples. However, the invention is not limited thereto, and each configuration can be replaced with any one that can perform the same function, or any configuration can be added.

EXAMPLES

The present invention will be explained more specifically with reference to the examples and comparative examples below, but the present invention is not intended to be limited to these examples and various modifications can be made without deviating from the technical spirit of the present invention.

Comparative Example 1 to 6 and Example 1 to 7

An aqueous solution of 0.079M iodine and 0.60M potassium iodide was used as the standard solution, and an etching solution was prepared by adding organic solvent to this standard solution. Next, a 2×2 cm Ni specimen was electrolytically plated with 3 μm thick gold, and immersed in the aforementioned etching solution at a solution temperature of 30° C. stirred at approximately 200 rpm for 1 minute to etch. The specimen was rinsed with ultrapure water, dried with nitrogen gas, and the etching rate was calculated by the gravimetric method. The results are shown in table 1 and FIG. 1.

TABLE 1

| | | | | | |
|---|---|---|---|---|---|
| | | Etching rate of gold film | | | |
| | Iodine concen-tration | Potassium iodide concen-tration | Organic Solvents | Organic Solvent Content (vol %) | Etching rate (nm/min.) |
| comparative example 1 | 0.079M | 0.60M | none | 0 | 440 |
| comparative example 2 | | | NMP | 10 | 420 |
| comparative example 3 | | | | 20 | 385 |
| comparative example 4 | | | | 30 | 346 |
| comparative example 5 | | | | 40 | 275 |
| comparative example 6 | | | | 50 | 155 |
| example 1 | | | 1,4-butangiol | 20 | 323 |
| example 2 | | | diethylene glycol | 20 | 310 |
| example 3 | | | 3-methoxy-N, N-dimethyl-propanamide | 10 | 424 |
| example 4 | | | | 20 | 328 |
| example 5 | | | | 30 | 290 |
| example 6 | | | | 40 | 237 |
| example 7 | | | | 50 | 141 |

From the results in table 1 and FIG. 1, it is observed that the etching rate can be controlled by 1,4-butanediol, diethylene glycol, and 3-methoxy-N,N-dimethylpropanamide without the use of NMP, and that these organic solvents have better etching control properties compared to NMP.

Comparative Example 7 to 12 and Example 8 to 14

An aqueous solution of 0.079 M iodine and 0.60 M potassium iodide was used as the standard solution, and a solution was prepared by adding organic solvent to this standard solution. Bare silicon substrate were treated with 1 % dilute hydrofluoric acid solution for 1 minute, rinsed with ultrapure water, and dried with nitrogen gas. The contact angle of 1 μl of the above solution on the bare silicon substrate was measured using a contact angle meter (Model CA-X150 manufactured by Kyowa Surface Science Co.). The results are shown in table 2 and FIG. 2.

TABLE 2

| | Iodine concentration | Potassium iodide concentration | Organic Solvents | Organic Solvent Content (vol %) | Contact angle(°) |
|---|---|---|---|---|---|
| | | | Contact angle | | |
| comparative example7 | 0.079M | 0.60M | none | 0 | 58.9 |
| comparative example8 | | | NMP | 10 | 32.2 |
| comparative example9 | | | | 20 | 33.2 |
| comparative example10 | | | | 30 | 34.1 |
| comparative example11 | | | | 40 | 34.8 |
| comparative example12 | | | | 50 | 34.8 |
| example8 | | | 1,4-butangiol | 20 | 40.5 |
| example9 | | | diethylene glycol | 20 | 44.4 |
| example10 | | | 3-methoxy-N,N-dimethylpropanamide | 10 | 36.5 |
| example11 | | | | 20 | 38.7 |
| example12 | | | | 30 | 36.9 |
| example13 | | | | 40 | 38.7 |
| example14 | | | | 50 | 37 |

Figure 2:
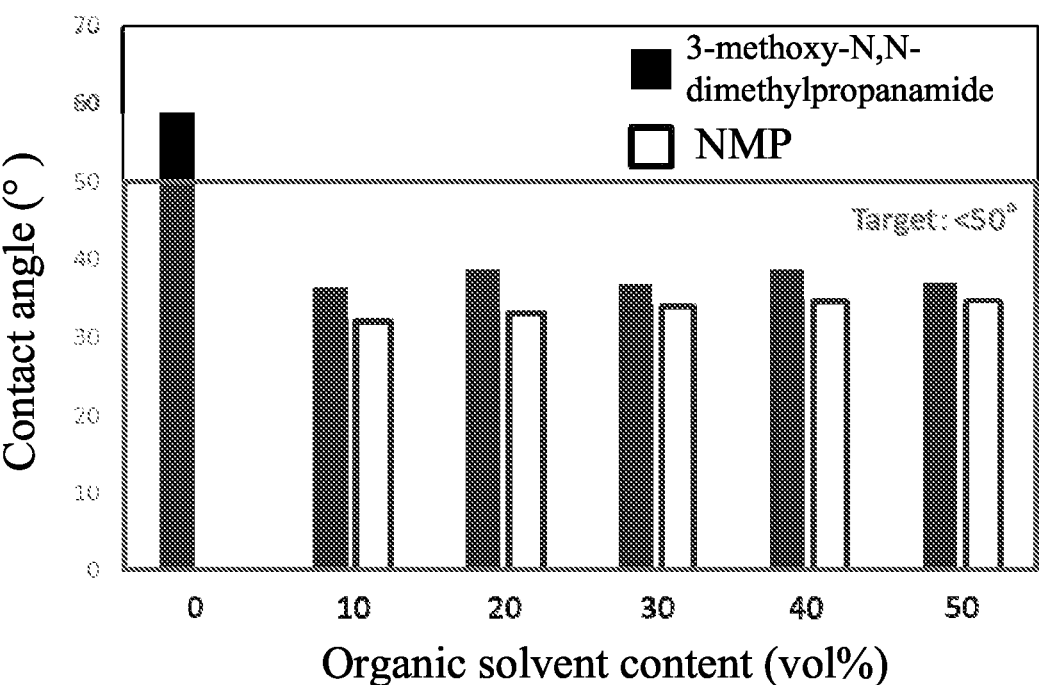
FIG. 2 is a graph showing the contact angle on a bare silicon substrate for a solution containing NMP or 3-methoxy-N,N-dimethylpropanamide.

From the results in Table 2 and FIG. 2, it was observed that contact angles below 50° C. can be achieved by 1,4-butanediol, diethylene glycol and 3-methoxy-N,N-dimethylpropanamide without the use of NMP, i.e., excellent wettability.

Comparative Example 13 to 18 and Example 15 to 21

An aqueous solution of 0.079M iodine and 0.60M potassium iodide was used as the standard solution, and an etching solution was prepared by adding organic solvent to this standard solution. Then, a 1×1 cm gold bump substrate (gold bump (15 μm)/gold sputter layer (210 nm)/TiW layer/Si layer) was immersed in the above etching solution at a liquid temperature of 30° C. stirred at about 200 rpm for the just etching time of gold sputter layer. The gold bump substrate was washed with ultrapure water, dried with nitrogen gas, and the surface smoothing ability and appearance of gold bumps were observed using a scanning electron microscope (SEM) (Hitachi High-Tech Corporation SU8200series). The results are shown in table 3 and FIGS. 3 and 4. The gold bump appearance in FIG. 4 was obtained by immersing the gold bump substrate in the etching solution of comparison examples 13 and example 15, 16, and 18 at a liquid temperature of 25° C. stirred at about 350 rpm for the just etching time of the gold sputter layer.

TABLE 3

| | Iodine concentration | Potassium iodide concentration | Organic Solvents | Organic Solvent Content (vol %) | Gold Bump surface Smoothing energy |
|---|---|---|---|---|---|
| | | | Surface smoothing energy | | |
| comparative example 13 | 0.079M | 0.60M | none | 0 | x |
| comparative example 14 | | | NMP | 10 | ⊚ |
| comparative example 15 | | | | 20 | ⊚ |
| comparative example 16 | | | | 30 | ⊚ |
| comparative example 17 | | | | 40 | ⊚ |
| comparative example 18 | | | | 50 | ⊚ |
| example 15 | | | 1,4-butangiol | 20 | ○ |
| example 16 | | | diethylene glycol | 20 | ○ |
| example 17 | | | 3-methoxy-N,N-dimethylpropanamide | 10 | ⊚ |
| example 18 | | | | 20 | ⊚ |
| example 19 | | | | 30 | ⊚ |
| example 20 | | | | 40 | ⊚ |
| example 21 | | | | 50 | ⊚ |

⊚: Nearly no roughness on gold bump surface

○: Slightly improved gold bump surface roughness x: Rough gold bump surface

Figure 3:
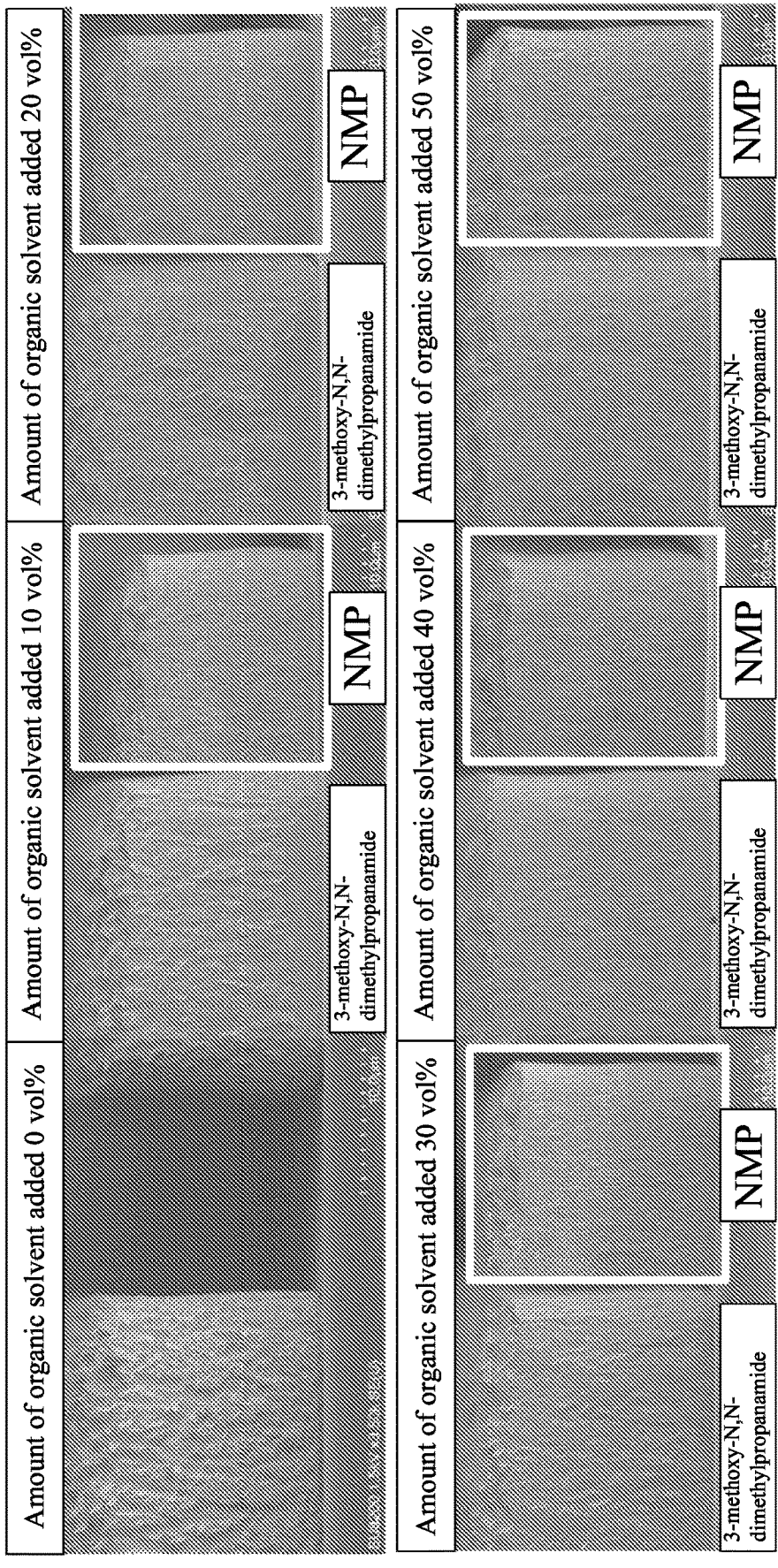
FIG. 3 is a graph showing the surface condition of gold bumps when immersed in an etching solution containing NMP or 3-methoxy-N,N-dimethylpropanamide.
Figure 4:
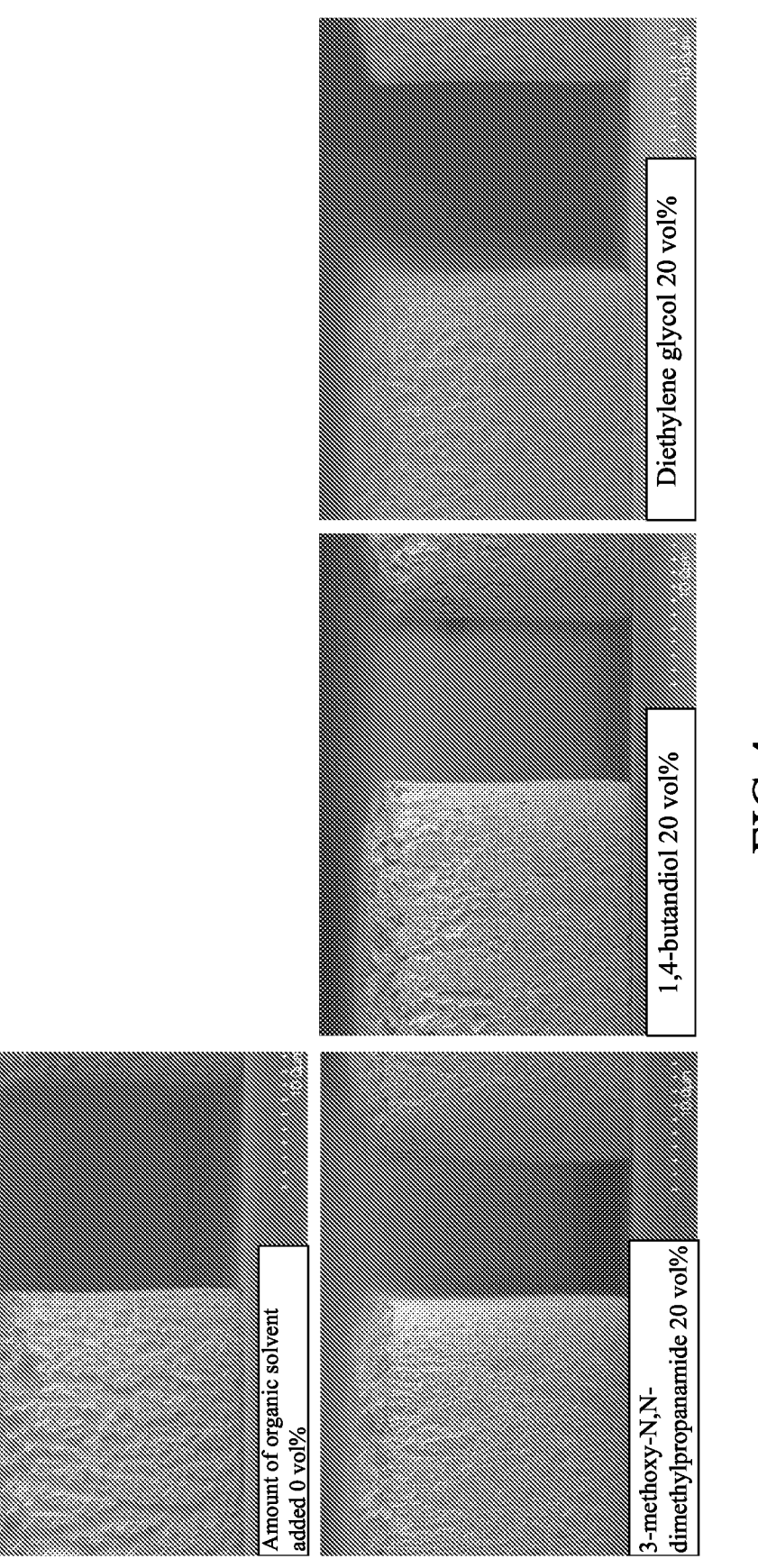
FIG. 4 is a graph showing the appearance of gold bumps when immersed in an etching solution containing 3-methoxy-N,N-dimethylpropanamide, 1,4-butanediol, or diethylene glycol.

The results in table 3 and FIG. 3 confirm that 1,4-butanediol, diethylene glycol, and 3-methoxy-N,N-dimethylpropanamide have the same gold bump surface smoothing ability as NMP without the use of NMP.

Comparative Example 19 to 21 and Example 22 to 26

An aqueous solution of 0.027M iodine and 0.11M potassium iodide was used as the standard solution, and an etching solution was prepared by adding organic solvent to this standard solution. Then, a 2×1 cm sputter gold substrate (resist/gold sputter layer (50 nm)/Ti layer/Si layer) was etched by immersing it in the above etching solution at a liquid temperature of 25° C. stirred at about 200 rpm for 1.5 times the just etching time of the gold sputter layer. The sputtered gold substrate was washed with ultrapure water, dried with nitrogen gas, and the amount of side etching was observed using a scanning electron microscope (SEM) (Hitachi High-Tech Corporation SU8200series). The results are shown in table 4.

TABLE 4

| | | | | Organic Solvent | |
|---|---|---|---|---|---|
| | Iodine concentration | Potassium iodide concentration | Organic Solvents | Content (vol %) | Side etching amount (nm) |
| comparative example 19 | 0.027M | 0.11M | none | 0 | 449 |
| comparative example 20 | | | NMP | 10 | 484 |
| comparative example 21 | | | | 20 | 198 |
| example 22 | | | 1,4-butangiol | 20 | 520 |
| example 23 | | | diethylene glycol | 20 | 480 |
| example 24 | | | 3-methoxy-N,N-dimethylpropanamide | 10 | 411 |
| example 25 | | | | 20 | 225 |
| example 26 | | | | 25 | 90 |

The results in Table 4 confirm that 1,4-butanediol, diethylene glycol, and 3-methoxy-N,N-dimethylpropanamide can suppress the side etching amount without the use of NMP.

Comparative Example 22 to 23 and Example 27 to 28

A solution of 0.079 M iodine and 0.60 M potassium iodide was used as a standard solution and a solution was prepared by adding organic solvent to this standard solution, and the iodine volatilization inhibition ability was evaluated by redox titration using sodium thiosulfate solution at regular time intervals. The results are shown in Table 5.

TABLE 5

Iodine volatilization inhibition ability

| | Iodine concentration | Potassium iodide concentration | Organic Solvents | Organic Solvent Content (vol %) | Iodine volatilization inhibiting ability |
|---|---|---|---|---|---|
| comparative example 22 | 0.079M | 0.60M | none | 0 | x |
| comparative example 23 | | | NMP | 20 | ○ |
| example 27 | | | 3-methoxy-N,N-dimethylpropanamide | 20 | ○ |
| example 28 | | | | 25 | ○ |

○: Iodine content change rate of 5% or less after 24 hours.

Δ: Iodine content change rate after 24 hours: 5% or more but less than 20%.

x: Iodine content change rate of 20% or more after 24 hours.

The results in table 5 and FIG. 5 confirm that 1,4-butanediol, diethylene glycol, and 3-methoxy-N,N-dimethylpropanamide can inhibit iodine volatilization without the use of NMP.

What is claimed is:

1. An etching solution for gold or gold alloy, characterised in that the etching solution comprising:

iodine, iodide, organic solvent and water, wherein the organic solvent is selected one or more from a group consisting of:

3-methoxy-N,N-dimethylpropanamide and 3-butoxy-N, N-dimethylpropanamide.

2. The etching solution as claimed in claim 1, wherein the organic solvent is 3-methoxy N,N-dimethylpropanamide.

3. The etching solution as claimed in claim 1, wherein the etching solution is free of N-methyl-2-pyrrolidinone.

4. The etching solution as claimed in claim 1, wherein the iodide is potassium iodide.

5. A method for etching the gold film formed on a substrate, characterised in that the method comprising immersing the substrate in the etching solution as claimed in claim 1.

6. The etching solution as claimed in claim 2, wherein the etching solution is free of N-methyl-2-pyrrolidinone.

7. The etching solution as claimed in claim 2, wherein the iodide is potassium iodide.

8. The etching solution as claimed in claim 3, wherein the iodide is potassium iodide.

9. A method for etching a gold film formed on a substrate, comprising immersing the substrate in the etching solution as claimed in claim 2.

10. A method for etching a gold film formed on a substrate, comprising immersing the substrate in the etching solution as claimed in claim 3.

11. A method for etching a gold film formed on a substrate, comprising immersing the substrate in the etching solution as claimed in claim 4.

12. The etching solution as claimed in claim 1, wherein the organic solvent further comprises one or more selected from a group consisting of: ethylene glycol, propylene glycol, diethylene glycol, 1,2-ethanediol, 1,4-butanediol and 2,3-butanediol.

* * * * *